(12) United States Patent  
Nagashima et al.

(10) Patent No.: US 7,219,208 B2
(45) Date of Patent: May 15, 2007

(54) NETWORK STORAGE CONFIGURATION MANAGEMENT

(75) Inventors: Yuichiro Nagashima, Yokohama (JP); Shotaro Ohno, Los Gatos, CA (US)

(73) Assignee: Hitachi, Ltd., Tokyo (JP)

( * ) Notice: Subject to any disclaimer, the term of this patent is extended or adjusted under 35 U.S.C. 154(b) by 175 days.

(21) Appl. No.: 10/898,569

(22) Filed: Jul. 23, 2004

(65) Prior Publication Data

US 2005/0229030 A1    Oct. 13, 2005

(30) Foreign Application Priority Data

Mar. 5, 2004 (JP) ............................. 2004-061686

(51) Int. Cl.
*G06F 12/02* (2006.01)

(52) U.S. Cl. .................. 711/170; 709/226; 709/223
(58) Field of Classification Search ............... None
See application file for complete search history.

(56) References Cited

U.S. PATENT DOCUMENTS 5,680,634 A * 10/1997 Estes ..................... 712/15
6,611,923 B1   8/2003 Mutalik et al.
6,704,885 B1   3/2004 Salas-Meza et al.
6,836,830 B1   12/2004 Yamagami et al.
2003/0088651 A1 * 5/2003 Wilson, Jr. ................. 709/221
2005/0021908 A1   1/2005 Ohno et al.

FOREIGN PATENT DOCUMENTS

JP    2002-063063    2/2002

* cited by examiner

*Primary Examiner*—B. James Peikari
(74) *Attorney, Agent, or Firm*—Townsend and Townsend and Crew LLP

(57) ABSTRACT

The present invention allows a pair to be formed between a plurality of discrete volumes and the progress thereof to be managed by means of a remote operation from a management server. Management server 10 instructs respective host computers 20, 30 to generate configuration files 23, 33. Next, management server 10 instructs host computers 20, 30 to start up HORCM (Hitachi Remote Copy Module) instances 24, 34. The generation of the configuration files and the startup of the HORCM instances can be separated. In one mode, configuration files are generated and the HORCM instances are started up, while, in another mode, only configuration files are generated. In yet another mode, the HORCM instances are started up when predetermined conditions are fulfilled. A more flexible operation can thus be performed.

7 Claims, 13 Drawing Sheets

FIG. 3

Config File

DEFINITION OF HORCM INSTANCE
HOST NAME, NUMBER OF PROGRAM COMMUNICATION PORT, MONITORING INTERVAL...

DEFINITION OF CONTROL DEVICE
DEVICE FILE NAME, STORAGE SUBSYSTEM IDENTIFIER...

DEFINITION OF PAIR VOLUME
GROUP NAME, PORT NAME, LDEV NUMBER...

FIG. 4A

| STORAGE CONFIGURATION | | | | | |
|---|---|---|---|---|---|
| DEVICE No. | RAID NAME | HOST NAME | NAME OF DISK ON HOST | VOLUME CLASSIFICATION | SYNCHRONIZATION STATE |
| 0:00 | RAID 1 | HOST 1 | DEVICE 1 | P-VOL | SYNC |
| 0:01 | RAID 1 | HOST2 | DEVICE 2 | S-VOL | SYNC |
| 0:02 | RAID 1 | ... | ... | ... | ... |
| 0:03 | RAID 1 | HOST 1 HOST2 | DEVICE 4 DEVICE 4 | ... | ... |
| ⋮ | ⋮ | ⋮ | ⋮ | ⋮ | ⋮ |

FIG. 4B

| DISK MANAGEMENT TABLE | | | | |
|---|---|---|---|---|
| DISK NAME | RAID NAME | PORT | DEVICE No. | NOTE |
| DEVICE 1 | RAID 1 | P3A | 0:00 | P-VOL |
| DEVICE 2 | RAID 1 | P3A | 0:01 | S-VOL |
| DEVICE 3 | RAID 1 | P3B | 0:02 | — |
| DEVICE 4 | RAID 1 | P3B | 0:03 | CMD |

FIG. 4C

ConfigFile GENERATION INSTRUCTION INFORMATION

| P-VOL | HOST 1 | DEVICE 1 | S-VOL | HOST 2 | DEVICE 2 |
|---|---|---|---|---|---|

PRIMARY VOLUME DESIGNATION SECTION | SECONDARY VOLUME DESIGNATION SECTION

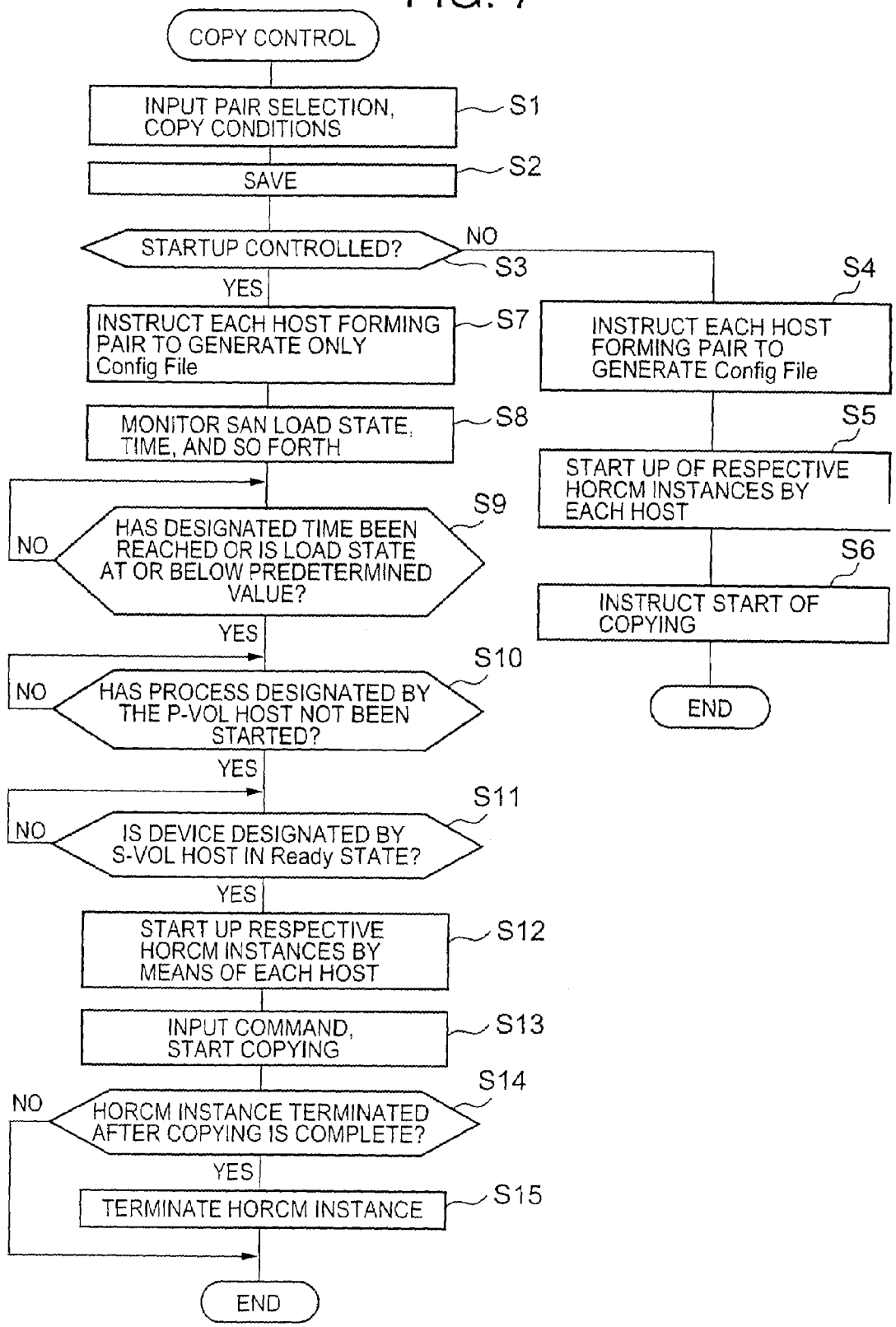

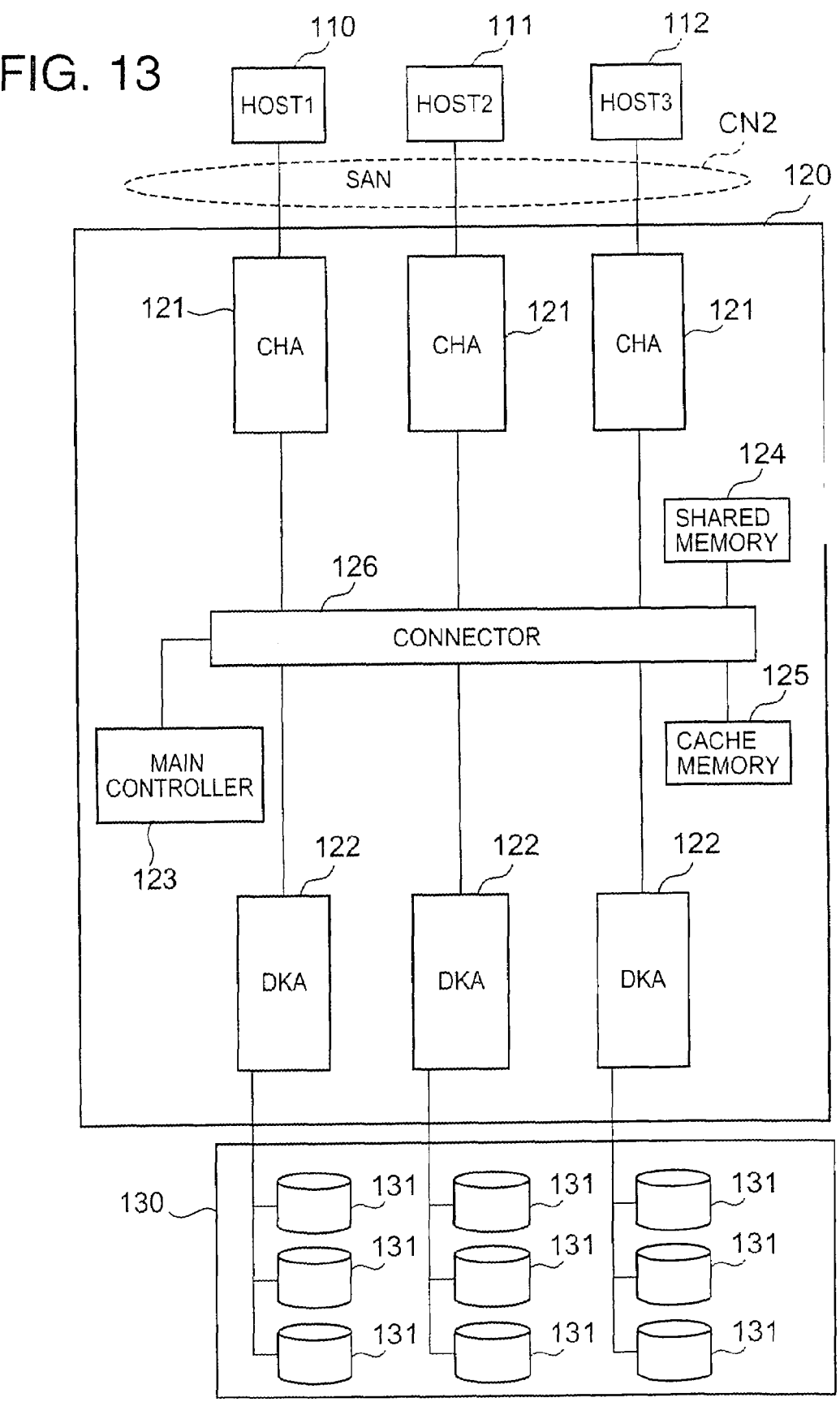

NETWORK STORAGE CONFIGURATION MANAGEMENT

CROSS-REFERENCE TO RELATED APPLICATIONS

This application relates to and claims priority from Japanese Patent Application No. 2004-61686 filed on Mar. 5, 2004, the entire disclosure of which is incorporated herein by reference.

BACKGROUND OF THE INVENTION

1. Field of the Invention

The present invention relates to a storage system that connects a storage device, such as, for example, a disk array subsystem, and a host computer via a communication network.

2. Description of the Related Art

Data management systems, which handle large volumes of data, such as, for example, those used by local governments, corporations, and so forth, for example, manage data by using a storage subsystem such as a disk array device. A disk array device is formed by arranging a multiplicity of disks in the form of an array, and is constructed based on, for example, a RAID (Redundant Array of Independent Inexpensive Disks) scheme. In a disk array device, a logical volume (LU) constituting a logical storage region can be constructed on a physical disk. The disk array device provides a host computer such as an application server with a logical volume.

The host computer and disk array device are connected via a communication network such as a SAN (Storage Area Network), for example. Each host computer connected to the SAN is capable of reading and writing data by accessing a self-allocated logical volume (or a logical volume for which the host computer has access rights) among the logical volumes included in the disk array device.

A technology that provides a SAN with a management server; connects each host computer, storage device, and so forth, to a management server by means of a LAN (Local Area Network); and performs integrated control is also known (Japanese Patent Application Publication No. 2002-63063).

A data group used by the host computer that is executing a variety of tasks must be backed up at regular or irregular intervals. The volume content of the host computer (task server) providing a client with task services is copied to a host computer (backup server) that performs backup processing. Further, the volume content that is copied to the backup server is backed up to a backup device such as, for example, a tape device.

For example, when a task server volume is backed up, each logical volume is allocated to a task server and backup server, and a copy pair consisting of a primary volume, which is to be the copy source, and a secondary volume, which is to be the copy destination, is established. Volume copying is then executed when the opportunity arises.

Therefore, the storage system must be reconfigured in accordance with occasional backup requests. However, even when a management server is provided, the labor involved in setting and changing storage configuration information via a network is complicated and time-consuming. When, for example, a storage administrator reconfigures a storage system and so forth, the reconfiguration must be reported by telephone, email, or the like, to the administrator of each host computer sharing the storage. Furthermore, because configuration information held by each host computer must also be changed in accordance with the reconfiguration to the storage system, an administrator who is to perform management work for each host computer is then required. Therefore, when setting adjustments are to be made to the storage configuration information, the storage administrator must contact the administrators of all the host computers involved and the administrator of each host computer must then perform the complex and time-consuming work of setting and changing storage configuration information.

SUMMARY OF THE INVENTION

The present invention was conceived in view of the above problems. An object of the present invention is to provide a storage system that prompts storage configuration information to be set in a quick and efficient manner by means of an instruction from a management computer. Another object of the present invention is to provide a storage system that allows straightforward centralized management of discrete copy-pair volumes on a network by performing a series of operations via the management computer. A further object of the present invention is to provide a storage system that allows volume copying to be controlled in stages or in a plurality of modes by means of instructions from the management computer. Further objects of the present invention will become apparent from the description of the embodiment that follows.

BRIEF DESCRIPTION OF THE DRAWINGS

FIG. 3 is an illustrative view providing an outline of the configuration file;

FIG. 4A is an illustrative view of the data structure of storage configuration information; FIG. 4B is an illustrative view of the data structure of the disk management table; and FIG. 4C is an illustrative view showing the data structure of a command instructing the generation of a configuration file;

FIG. 7 is a flowchart showing the overall operation of the storage system;

FIG. 13 is a block diagram of a disk array device that can be employed as a storage subsystem.

DESCRIPTION OF THE SPECIFIC EMBODIMENTS

Figure 1:
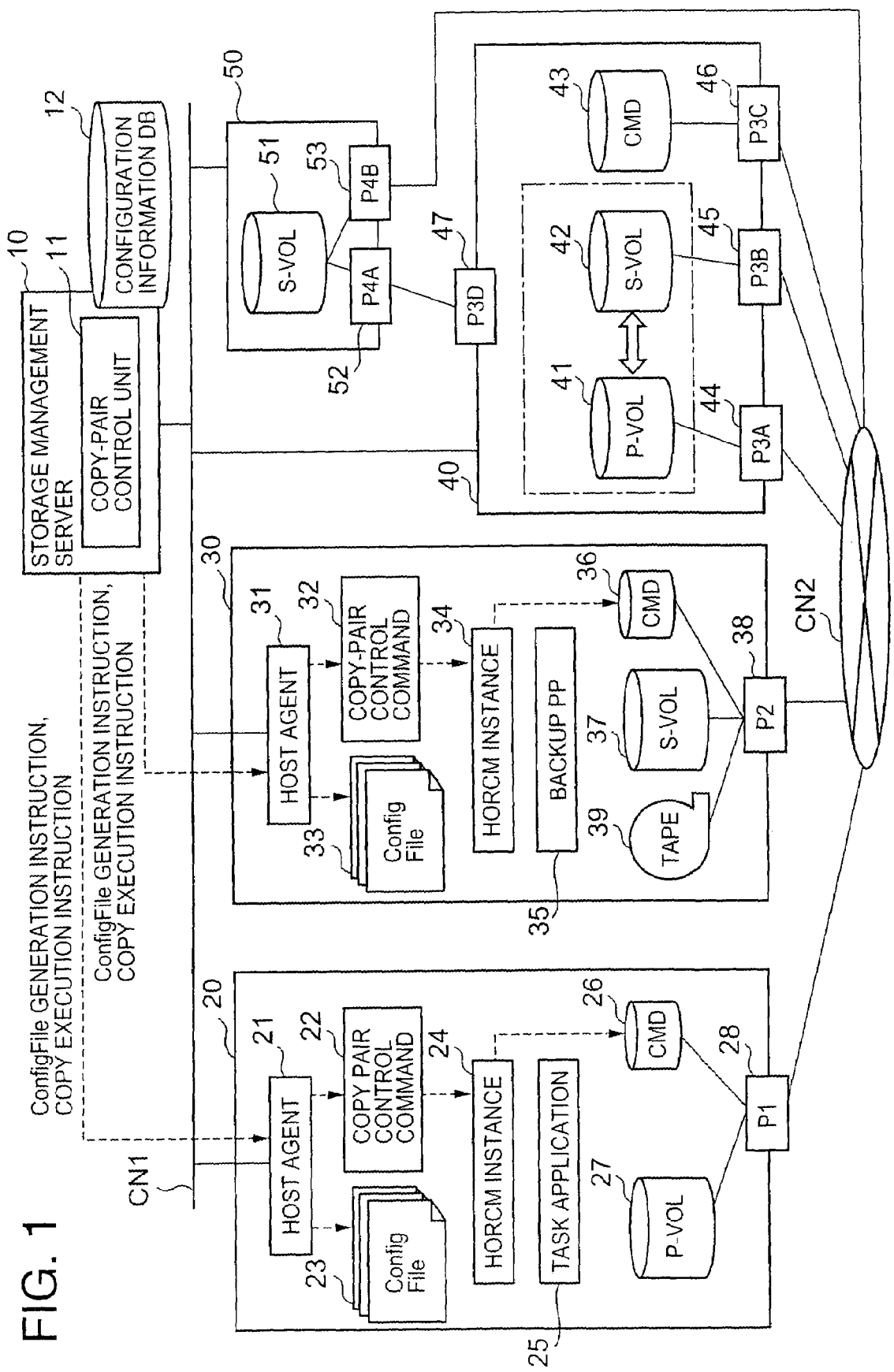
FIG. 1 is a block diagram providing an overview of the storage system of the first embodiment example of the present invention.

In order to resolve the above problems, in the storage system according to the present invention, the progressive states of predetermined processing operations (volume copying, backups, and so forth) can be centrally managed by means of a management computer, and can be managed in a plurality of stages.

That is, the storage system according to the present invention comprises at least one or more host computers, at least one or more storage devices that provide a host computer with a storage region, and a management computer capable of managing storage devices and host computers. Further, the management computer comprises a reconfiguration instruction section that generates reconfiguration instructions for changing storage configuration information on the basis of storage configuration information relating to storage device allocated to the host computer, and outputs the reconfiguration instruction to the host computer; and a progress management unit that controls the output timing of reconfiguration instructions from the reconfiguration instruction section, wherein the host computer orders the storage device to change the configuration based on the reconfiguration instruction inputted by the reconfiguration instruction section.

In the present embodiment, the host computer is a computer device that uses a storage device. Possible examples of a computer device include a personal computer, a workstation, a mainframe, and so forth. The storage device comprises at least one, or more typically a multiplicity of, physical storage devices such as a hard disk, semiconductor memory, or optical disk, for example, and establishes virtual storage regions (logical volumes) on physical storage regions and provides the host computers with the virtual storage regions. Storage configuration information indicates the usage state, and the like, of the storage devices, and indicates, for example, which host computer is able to use which storage device.

In cases where the storage device is reconfigured, the management computer acquires storage configuration information held before the reconfiguration by the host computer. This storage configuration information indicates the configuration prior to any reconfiguration. The management computer then generates a reconfiguration instruction for changing the storage configuration information in accordance with the configuration that is going to be reconfigured, and then communicates the reconfiguration instruction to the host computer. The host computer, which receives the reconfiguration instruction, then directs a reconfiguration to the storage device. Thus, connections between administrators that have required time-consuming manual work can be cancelled, and the configuration of the storage device can be changed via the host computer by means of an instruction from the management computer.

Because the progress management unit then controls the output timing of the reconfiguration instruction, the progressive states of the reconfiguration can be controlled in a plurality of stages or a plurality of modes. The user's ease of operation improves as a result.

The progress management unit can be enabled to control the progress of the reconfiguration to the storage device in a plurality of modes. The plurality of modes can be broadly classified as a preparation mode in which only preparations for a reconfiguration are made and the execution of the reconfiguration is delayed, and as a successive execution mode in which, for example, preparations for the reconfiguration and the execution of the reconfiguration are executed successively. In addition, preparation modes can also include conditional execution modes in which, by presetting a variety of predetermined conditions, reconfigurations are executed when predetermined conditions are fulfilled.

The progress management unit can also be enabled to control the progress of the reconfiguration of the storage device through a plurality of stages on the basis of preset execution conditions.

Execution conditions can include, for example, at least one of the following: a case where the storage device is in a predetermined low load state, a case where a designated time has been reached, a case where a predetermined device can be used, and a case where a predetermined program has not started.

For example, in a case where a backup by means of volume copying is performed, the storage device is subjected to a storage load in proportion to the backup processing. When the storage load of the storage device increases, a drop in responsiveness sometimes occurs. Therefore, reconfigurations (volume copying, backups, and so forth) that increase responsiveness can be made in task processing and so forth by executing reconfigurations when the storage device is in a predetermined low load state. Alternatively, a backup can be made while responsiveness in task processing is increased due to a small storage load in the storage device, i.e., a backup can be ordered at a predetermined time at which the load of the storage device is small (a time frame after a task is complete, for example). A backup can also be made when a predetermined backup data device or similar device required at the time of a backup is employed. In addition, a backup can be made when a predetermined application program or similar program that provides a task service, but whose responsiveness is likely to be slowed by the backup, has not been started. One such condition can be set or a plurality of conditions can be set in combination while setting predetermined activation of backups. Another configuration permits a designation indicating that a backup can be made when a predetermined process has started.

When the reconfiguration to the storage device is complete, the progress management unit may be configured to instruct a host computer to cease running a predetermined process that is related to the reconfiguration.

According to an embodiment of the present invention, a reconfiguration instruction is outputted from the management computer to the host computer and the host computer then orders a reconfiguration of the storage device on the basis of the reconfiguration instruction. For the purpose of ordering a reconfiguration of the storage device, in cases where a predetermined process has started on the host computer, the progress management unit is able to order termination of the startup of a predetermined process after the reconfiguration is complete. The storage load of the host computer can be reduced to the level at which the predetermined process is terminated, at which point more computer resources can be allocated to the task services.

Reconfiguration instructions can include a reconfiguration preparation instruction for preparing a reconfiguration of the storage device and a reconfiguration execution instruction for executing the reconfiguration prepared by means of this reconfiguration preparation instruction. Further, the progress management unit is capable of (1) outputting reconfiguration preparation information from the reconfiguration instruction section to the host computer, and (2) outputting a reconfiguration execution instruction from the change instruction unit to a host computer when preset execution conditions are fulfilled.

A reconfiguration is directed by means of a reconfiguration preparation instruction ordering preparation for a reconfiguration (the "first reconfiguration instruction") and a reconfiguration execution instruction executing the prepared reconfigurations (the "second reconfiguration instruction") in a plurality of stages. Accordingly, an earlier preparation stage included in the reconfiguration and a subsequent execution stage that executes the prepared reconfigurations can be separated. Therefore, the execution times of the preparation stage and execution stage can be staggered or executed at substantially the same time depending on the case, whereby the storage configuration can be more flexibly set and changed.

In one aspect of the present invention, a plurality of host computers exists. The reconfiguration preparation instruction is outputted to each of the host computers and the reconfiguration execution instruction is outputted to a predetermined host computer among the respective host computers.

That is, in cases where a plurality of host computers are part of the storage system, reconfiguration preparation instruction and reconfiguration execution instruction are not outputted all together to the respective host computers, the outputted information instead being controlled by the host computers. That is, the reconfiguration preparation instruction is reported to all the host computers involved in the reconfiguration of the storage device. On the other hand, the reconfiguration execution instruction is outputted only to one or more predetermined host computers among the host computers instructed to make preparations for a reconfiguration. The storage configuration can be set, modified, and so forth more quickly and efficiently by varying the details of the reported instruction in accordance with the role of each host computer. For example, this process can apply to a host computer that comprises a primary volume when a case is cited where a copy of a logical volume is an example of a predetermined host computer to which the reconfiguration execution instruction is reported.

According to another aspect of the present invention, a computer program controls a management computer that is capable of managing at least one or more host computers, and at least one or more storage devices that provide the host computers with a storage region, the program prompting a computer to implement: a reconfiguration instruction function to generate a reconfiguration instruction prompting an instruction for a reconfiguration to be issued to the storage device by the host computer on the basis of storage configuration information relating to the storage devices allocated to the host computers, and to output the reconfiguration instruction to the host computers; and a progress management function to control the output timing of the reconfiguration instruction by the reconfiguration instruction function. Such a program can be stored and distributed in a storage medium such as a semiconductor memory device, hard disk drive, and optical disk drive, for example. The program can also be sent via a communication network.

An embodiment of the present invention will be described below based on the attached drawings. This embodiment discloses a storage system that comprises a plurality of host computers, at least one or more storage devices that provide each of the host computers with a volume, and a management computer that manages the storage devices. Further, the management computer comprises a copy condition designation section that designates a copy source volume and copy destination volume, and a copy start condition and copy end condition, respectively, on the basis of acquired volume information; a copy preparation instruction section that instructs both the host computer comprising the copy source volume and the host computer comprising the copy destination volume to generate configuration information for executing volume copying; a copy execution instruction section that instructs a predetermined host computer among the respective host computers to execute volume copying on the basis of the configuration information; and a copy progress management unit for controlling the operation of the copy preparation instruction section and the copy execution instruction section. The copy progress management unit (1) instructs each of the host computers to generate the configuration information via the copy preparation instruction section; (2) instructs the predetermined host computer to start the volume copying via the copy execution instruction section when the copy start condition is fulfilled; and (3) terminates a predetermined process running on the host computer that is related to the volume copying, on the basis of the copy end condition when the volume copying is complete. The predetermined host computer comprises: an agent section that communicates with the copy preparation instruction section and the copy execution instruction section; and a copy execution processing unit that is generated on the basis of the configuration information generated by the agent section, wherein the copy execution processing unit starts up on the basis of an instruction from the copy execution instruction section, and wherein the copy execution processing unit stops on the basis of an instruction from the copy progress management unit.

In the case of the storage system of this embodiment, a volume copying method (or backup method) that comprises the following steps is disclosed. The method comprises the steps of setting a copy source volume and a copy destination volume, selecting any one of a first mode in which copying is executed directly or a second mode in which copying is executed when predetermined conditions are fulfilled, instructing the host computer that comprises the copy source volume and the host computer that comprises the copy destination volume to each generate reconfiguration information when the second mode is selected, monitoring whether the predetermined conditions are fulfilled, starting predetermined processes to perform copy processing by means of the respective host computers when the predetermined conditions are fulfilled, executing volume copying between the copy source volume and the copy destination volume by using each of the predetermined processes, and terminating each of the predetermined processes when these processes have been preset in cases where volume copying is complete.

1. First Embodiment Example

A first embodiment example of the present invention will now be described based on FIGS. 1 to 10. FIG. 1 is a block diagram providing an overview of the storage system of this embodiment example of the present invention.

As will be described subsequently, the storage system can comprise a storage management server 10 (hereinafter, "management server"), a plurality of host computers 20, 30, a storage subsystem 40, another storage subsystem 50, and a first communication network CN1 and second communication network CN2 that connect these devices.

Storage management server 10 is able to manage a storage subsystem 40. Management server 10 comprises a copy-pair control unit 11 and a configuration information database (hereinafter, "DB") 12. Management server 10 instructs host computers 20, 30 to generate a configuration file (shown as "Config File" in the drawings) when storage subsystem 40 is reconfigured. In addition, either following the instruction given by management server 10 to generate the configuration file or at a time different from the time the configuration file generation instruction is given, management server 10 directs host computer 20, where the primary volume is established, to start copying.

Management server 10 acquires and retains the newest state of storage subsystem 40 when the configuration of storage subsystem 40 is changed by host computer 20. Management server 10 centrally manages the storage configuration of the storage system, setting and changing the storage configuration by means of a remote operation. Further, management server 10 manages the progress of the operation of predetermined processing to change the storage configuration.

First host computer 20 can be constituted as an application server by a computer device such as, for example, a personal computer, workstation, or mainframe. Host computer 20 comprises information input devices such as a keyboard switch, a pointing device, and a microphone (not shown), for example, and information output devices (not shown) such as a monitor display, or speaker, for example. Host computer 20 comprises a host agent 21, a copy-pair control command 22, a configuration file 23, a HORCM instance 24 (Hitachi Open Remote Copy Module), a task application program 25, a control device (abbreviated to 'CMD' in the drawings) 26, a primary volume 27, and a port 28.

Host agent 21 is a program module that generates a configuration file 23 based on an instruction received from management server 10 and that orders the execution of a copy command by starting HORCM instance 24.

HORCM instance 24 is a process that handles synchronization of stored content between volumes that constitute a pair. HORCM instance 24 performs copy processing based on a command that is inputted via a copy-pair control command 22. HORCM instance 24 can also be designated a predetermined process to execute a predetermined operation (such as a volume copy instruction or a backup instruction).

Host agent 21 and HORCM instance 24 respectively provide functions by using various computer resources (microprocessor, memory, I/O circuit or the like) that are included in host computer 20. Part of host agent 21 and HORCM instance 24 can also be composed of a hardware circuit.

Configuration file 23 is a file describing the structure of the storage resources that host computer 20 comprises. Information that can be stored in configuration file 23 can be, for example, the location of the actual body of primary volume 27 and on which volumes of which host computers pairs can be formed.

Control device 26 serves to control storage subsystem 40. HORCM instance 24 asks the storage subsystem 40 to execute commands via control device 26. Primary volume 27 is provided by storage subsystem 40 and mounted in host computer 20. The actual body of primary volume 27 is volume 41 in storage subsystem 40. Primary volume 27 of host computer 20 exists virtually, while the actual body thereof exists in storage subsystem 40. Port 28 sends and receives data, commands, and the like by using a communication network CN2 constituted as a SAN, for example. For example, port 28 is constituted as a fiber channel HBA (Host Bus Adapter).

Second host computer 30, like first host computer 20, comprises a host agent 31, a copy-pair control command 32, a configuration file 33, a HORCM instance 34, a backup program ("backup PP" in the drawings) 35, a control device 36, a secondary volume 37, a port 38, and a backup device 39. The configuration of each of these parts is the same as the configuration of the corresponding parts in first host computer 20, and hence a description of the common parts is omitted. Second host computer 30 is used as a backup server for backing up the data of first host computer 20, and the actual body of secondary volume 37 is volume 42 of storage subsystem 40.

Backup program 35 serves to control the operation of backup device 39. A tape device or the like, for example, can be used as backup device 39. The actual physical body of backup device 39 can be provided outside host computer 30.

The stored content of primary volume 27 is stored in secondary volume 37 by means of volume copying (mirroring). The stored content of primary volume 27 is copied in its entirety to secondary volume 37 by the initial copying. Thereafter, the pair of respective volumes 27, 37 is cancelled and the stored content of secondary volume 37 is copied to backup device 39. Accordingly, the stored content of primary volume 27 can be backed up at a certain time.

In order to synchronize primary volume 27 and secondary volume 37 after the initial copying is complete, a request for an update to primary volume 27 is also reflected in secondary volume 37 or incremental data produced in primary volume 27 is managed by a partial bitmap and reflected in secondary volume 37 by means of incremental copying of only the parts generating the incremental data.

Storage subsystem 40 is constituted as a RAID-based disk array device, for example. Storage subsystem 40 comprises a primary volume 41, secondary volume 42, and a control device 43. Storage subsystem 40 comprises a multiplicity of physical disk drives, logical storage regions (also known as logical volumes (Logical Unit) or LDEV) being established on the physical storage regions provided by the disk drives. Storage subsystem 40 can comprise a multiplicity of logical volumes.

Storage subsystem 40 provides each of host computers 20, 30 with logical volumes 41, 42. For example, the host computers 20, 30 are, respectively, able to access only a self-allocated volume (41 or 42) by means of zoning, LUN (Logical Unit Number) masking, and so forth. Control device 43 is shared respectively by host computers 20, 30. Ports 44 to 46 are communication ports for accessing respective volumes 41 to 43 via communication network CN2, and are, for example, in the form of fiber channel adapters. Further, another port 47 is for a connection to another storage subsystem 50.

The other storage subsystem 50 can comprise elements in the same fashion as storage subsystem 40. Storage subsystem 50 comprises at least one or more logical volumes 51, a port 52 for a connection with storage subsystem 40, and a port 53 for a connection with communication network CN2. In the drawings, to facilitate simplicity of description, one logical volume 51 is shown, while an illustration of the control device and so forth is omitted.

Storage subsystem 40 and storage subsystem 50 are capable of communication therebetween. Further, logical volume 41 of storage subsystem 40 and logical volume 51 of storage subsystem 50 can be set as a copy pair. That is, in this embodiment example, two types of volume copying can be implemented. One type of volume copying involves forming a pair from logical volumes 41 and 42 in the same storage subsystem 40 and then performing volume copying. The other type of volume copying involves volume copying between different storage subsystems 40 and 50.

First communication network CN1 is constituted as a management-dedicated LAN, for example, while the second communication network CN2 is constituted as a SAN, for example. First communication network CN1 connects management server 10, respective host computers 20, 30, and respective storage subsystems 40, 50 to allow mutual communication therebetween. First communication network CN1 transmits various instructions, management data, and so forth among the management server 10, each of the host computers 20, 30, and storage subsystems 40, 50. Second communication network CN2 connects respective host computers 20, 30 and storage subsystems 40, 50 to allow mutual communication therebetween, and transmits data and commands among these host computers 20, 30 and storage subsystems 40, 50.

Figure 2:
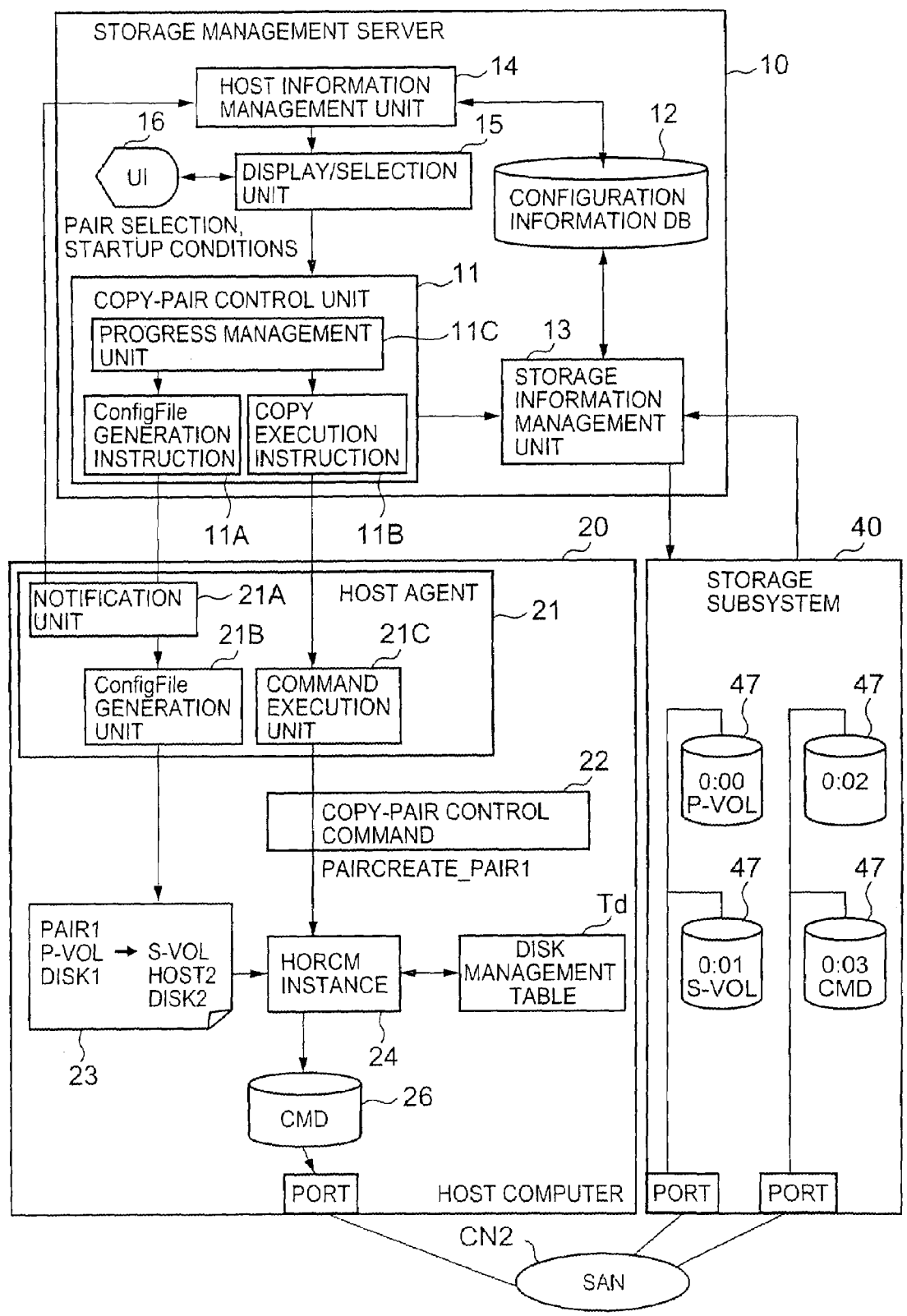
FIG. 2 is a block diagram showing the principal parts of the storage system in FIG. 1 in detail.
Figure 5A:
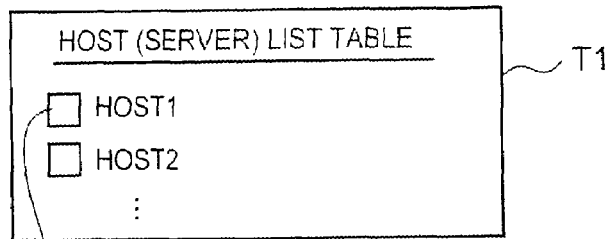
FIG. 5 is an illustrative view that schematically shows a host information management method.
Figure 5B:
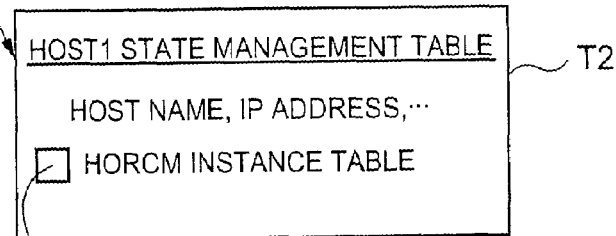
Figure 5C:
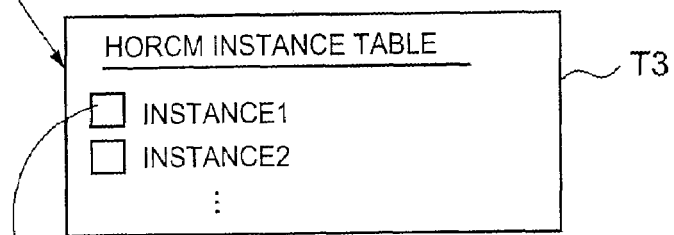
Figure 5D:
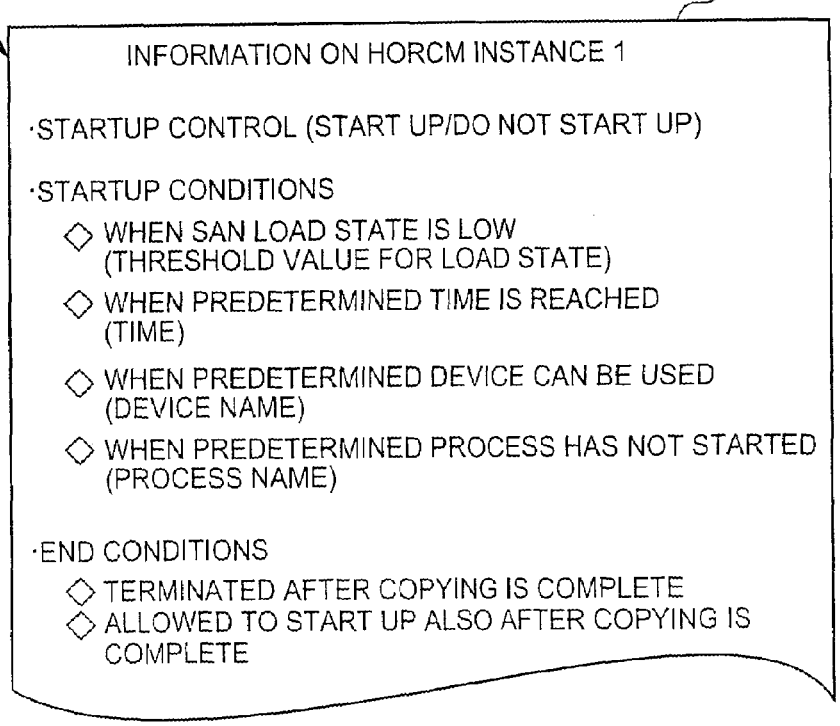

FIG. 2 is a block diagram showing the principal parts in FIG. 1. FIG. 2 shows a management server 10, a first host computer 20, and the storage subsystem 40. The detailed structure of management server 10 will be described first. In addition to copy-pair control unit 11 and configuration information DB12, management server 10 comprises a storage information management unit 13, a host information management unit 14, a display/selection unit 15, and a user interface (abbreviated to "UI" in the drawings) 16. Furthermore, copy-pair control unit 11, embodied as software, for example, comprises a configuration file-generation instruction unit 11A, a copy-execution instruction unit 11B, and a progress management unit 11C as internal functions.

Configuration file-generation instruction unit 11A instructs host agents 21, 31 of respective host computers 20, 30 to generate configuration files 23, 33 respectively, based on the storage configuration set by display/selection unit 15. Copy-execution instruction unit 11B instructs first host computer 20 in which primary volume 27 is established to execute a copy command. Further, prior to issuing a copy command, the copy-execution instruction unit 11B instructs each of host agents 21, 31 to start HORCM instances 24, 34. Progress management unit 11C manages the progressive states of the volume copying. As will be described subsequently, progress management unit 11C controls the operation of respective instruction units 11A, 11B in accordance with the copy conditions inputted via UI 16.

Storage information management unit 13 then acquires the status of storage subsystem 40 and reflects the status in configuration information DB12. Storage information management unit 13 confirms that the configuration of storage subsystem 40 has been changed via host computer 20 in accordance with an instruction from copy-pair control unit 11. Storage information management unit 13 issues a request to storage subsystem 40 to send the latest storage configuration information. Storage information management unit 13 updates the latest storage configuration information received from storage subsystem 40 and registers this information in configuration information DB.

Host information management unit 14 acquires volume information and so forth that includes control devices 26, 34 from each of host computers 20, 30. The acquired volume information is reflected in configuration information DB 12. Display/selection unit 15 shows a list of volumes that can be selected via UI 16 to the storage administrator. Further, host information management unit 14 is able to acquire attribute information (host name, IP address, and so forth) on each of host computers 20, 30, and information relating to HORCM instances 24, 34.

Display/selection unit 15 instructs copy-pair control unit 11 to set storage configuration information on the basis of the information that the storage administrator (user) inputs via UI 16. The storage administrator is also able to designate the copy execution conditions (more precisely, the start and stop conditions for the HORCM instances) via UI 16. The conditions designated by the storage administrator are inputted to copy-pair control unit 11.

The details of first host computer 20 will now be provided. Host agent 21 comprises a notification unit 21A, a configuration file 21B, and a command execution unit 21C. Notification unit 21A communicates with management server 10 via first communication network CN1. Notification unit 21A sends the content of configuration file 23, an operation completion report, and so forth to management server 10, and receives various instructions from management server 10. Further, notification unit 21A reports information on HORCM instance 24 to management server 10.

Configuration file generation unit 21B generates a configuration file 23 with the requested specifications in accordance with instructions from management server 10. Configuration file 23 permits a plurality of settings. However, in order to facilitate straightforward, simplified description, only one setting is shown in FIG. 2. Command execution unit 21C starts HORCM instance 24 and requests the execution of a copy command in accordance with instructions from management server 10.

Copy-pair control command 22 generates a command such as "paircreate_pair1", for example, on the basis of an instruction from command execution unit 21C, and inputs this command to HORCM instance 24. HORCM instance 24 then controls control device 26 in accordance with the inputted command. Disk management table Td is referenced at the time the copy command is generated. As will be described subsequently in conjunction with FIG. 4B, disk management table Td converts an abstract disk name recognized by the OS (Operating System) of host computer 20 into information that actually enables access. Further, when a command is inputted from HORCM instance 24 to control device 26, the content of the command instruction is transmitted to control device 43 of storage subsystem 40 via second communication network CN2. As a result, copying is executed between the volumes constituting a pair in storage subsystem 40. The copying between volumes is a so-called "server-free" process and is executed without intervention by host computer 20. Alternatively, volume copying can also be executed between storage subsystems 40, 50. The option to adopt volume copying within an enclosure or volume copying between enclosures is entrusted to the storage administrator.

Storage subsystem 40 comprises a plurality of logical volumes 47. Logical volumes 47 are virtual disk devices supplied to host computers 20, 30 and device discrimination data such as "0:00", "0:01", "0:02", and "0:03", for example, are assigned to these logical volumes. One logical volume 47 ("0:01") among logical volumes 47 is allocated to host computer 20 as primary volume 41 shown in FIG. 1.

Another logical volume 47 ("0:02") is allocated to host computer 30 as secondary logical volume 42 shown in FIG. 1. In addition, another logical volume 47 ("0:03") is used as control device 43 shown in FIG. 1. Logical volume 47 ("0:02") is unused or used by a host computer other that a host computer in the figure. An illustrative example was provided above but the present invention is not limited thereto. For example, primary volume 41 or secondary volume 42 can also be constructed by a plurality of logical volumes 47. Further, FIG. 2 illustrates a specific configuration of storage subsystem 40, the configuration of the port being different from that in FIG. 1.

FIG. 3 is an illustrative view of the outline of configuration files 23, 33 generated by host agents 24, 34 respectively. A configuration file can contain, for example, HORCM instance definition information, control device definition information, pair volume definition information, and so forth. HORCM instance definition information can include, for example, the name of the host computer that starts the HORCM instances, the number of the port for communications between programs, and the monitoring interval, for example. Control device definition information can include a device file name, storage subsystem identifier, and so forth, for example. Pair volume definition information can include, for example, the group name, the name of the port used for copying, and the number of the logical volume (LDEV number) used for copying. Further, although LU and LDEV have different labels, some LUs and LDEVs are basically the same. Although "LU" and "LDEV" are used for specific volumes in this specification, either term may be applied, if used consistently, to a range of logical storage regions.

FIG. 4 shows an example of a variety of data structures. FIG. 4A shows storage configuration information stored in configuration information DB12 of management server 10. The storage configuration information is constituted based on information acquired from each of host computers 20, 30, and storage subsystem 40 (or storage subsystems 40, 50).

Storage configuration information can be constituted, for example, by associating the name of the device provided by storage subsystem 40 (the name of logical volume 47 specified by the disk number), the RAID name for specifying storage subsystem 40, the name of the host to which the device is allocated, the name of the disk recognized on the host, the volume type indicating the application of the allocated volume, and the synchronized state showing the matched state of the stored content.

In the example shown in FIG. 4A, it can be seen that logical volume 47 labelled with the disk No. "0:00" belongs to the storage subsystem 40 specified by "RAID1" and that this logical volume is supplied as the primary volume to first host computer 20 specified by "Host1". Likewise, logical volume 47 labelled with disk No. "0:01" belongs to storage subsystem 40 specified by "RAID1" and is supplied as the secondary volume to second host computer 30 specified by "Host2". Further, it can be seen from the "sync" designation, which indicates that a synchronized state has been set, that the stored content of each volume supplied to respective host computers 20, 30 is synchronized. It is also clear that logical volume 47 specified by device No. "0:03", which belongs to storage subsystem 40 specified by "RAID1", is used as a control device and shared by each of host computers 20, 30.

FIG. 4B shows an example of the disk management table Td in FIG. 2. Disk management table Td associates device names, which are the names of the logical volumes supplied by storage subsystem 40; RAID names, which specify storage subsystem 40 to which each device belongs; the names of the ports for accessing each device, the numbers of the devices allocated to each device, and a note field, for example.

FIG. 4C shows an example of a configuration file generation instruction that is outputted to host computers 20, 30 by management server 10. Information instructing the generation of a new configuration file (Config File) comprises a primary volume designation section and a secondary volume designation section.

The primary volume designation section includes, for example, the name of the host (Host1) where the primary volume (P-VOL) is established, and the name of the device (Device1) in storage subsystem 40 used as the primary volume. The secondary volume designation section comprises, for example, the name of the host (Host2) where the secondary volume (S-VOL) is established, and the name of the device (Device2) in storage subsystem 40 used as the secondary volume. A configuration file generation instruction with the same content is reported to each of host computers 20, 30 belonging to the same pair. The "same content" designation indicates that the specific instructional content is the same, but header or similar parts describing the destinations and the like sometimes differ, for example. Host agents 21, 31 generate configuration files 23, 33 respectively on the basis of an instruction to generate the configuration files shown in FIG. 4C.

FIG. 5 is an illustrative view of part of the host information that is managed by host information management unit 14 of management server 10. Host information management unit 14 is able to correlate and store, for example, host list table T1, host state management table T2, HORCM instance table T3, and information T4 indicating the content of the HORCM instance.

The names of each host computer under the management of management server 10 are shown in list format in host list table T1. Host state management table T2 includes the host names, IP address states, and so forth, of the host computers selected in host list table T1, and a pointer to HORCM instance table T3. HORCM instance table T3 includes a pointer to detailed information T4 on HORCM instances that can be started up by the host computers. As mentioned above, a plurality of copy pairs can be established, and a HORCM instance is established for each copy pair.

Detailed information T4 on an HORCM instance can include, for example, startup control information, startup condition information, and end condition information. Startup control information can include either information to "start up" the HORCM instance or to "not start up" the HORCM instance.

Here, "start up" signifies a mode in which the HORCM instance is started up at the same time the generation of the configuration file is completed. "Not start up" signifies a mode in which, in order to prompt a startup by means of a special manual operation, and a mode in which startup is conditional, the operation is stopped in a state where only the configuration file is created.

Startup condition information can include at least one or more of several conditions for starting up the HORCM instance. Possible startup conditions include the following examples:

(1) a case where the load state of the storage subsystem ("SAN" in FIG. 5) is below a predetermined value;

(2) a case where a predetermined time is reached;

(3) a case where a predetermined device is in a usable state; and (4) a case where a predetermined process has not started.

In cases where volume copying is executed by starting the HORCM instance when the load state of the storage subsystem is below a predetermined value, a load threshold value for judging the startup conditions is designated. For example, the HORCM instance can be started up when the traffic volume of the port used for volume copying is less than the predetermined threshold value. However, the load state of the storage subsystem for starting up the HORCM instance is not limited to the traffic of the communication path used for copying. For example, the configuration can also be such that the HORCM instance is started up in cases where the usage amount of the cache memory is equal to or less than a predetermined value, and in cases where the CPU usage rate of the storage subsystem is equal to or less than a predetermined value.

In cases where the HORCM instance is started up when a predetermined time is reached, the startup time is designated. In cases where the HORCM instance is started up when a predetermined device is in a usable state, the name of the monitored device is designated. Possible device names can include, for example, backup device 39 or the like. When the HORCM instance is started up in cases where a predetermined process has not started, the name of the monitored process is designated. Possible processes can include a task application program 25 for providing task services, or the like. Because there is a risk of a drop in responsiveness when a backup is made while a task service is being provided, the HORCM instance can be started up after confirming that processes relating to the task service have not started.

Further, among the startup conditions, a condition according to which volume copying is executed as a result of a predetermined load state (main startup condition (1)) or a predetermined time being reached (the HORCM instance is started up) (main startup condition (2)) can be called a main startup condition. Further, when the usable state of a pre-determined device or the terminated state of a predetermined process is defined as a condition, such a condition is also known as a sub-startup condition. For example, at least one of main startup conditions (1) or (2) may be selected and a sub-startup condition need not be designated. Conversely, the configuration can be such that only the designation of sub-startup conditions is not allowed.

End condition information includes, for example, the designation of whether to terminate the HORCM instance after initial copying is complete or to start up the HORCM instance after the initial copying is complete. HORCM instances 24, 34 need not always be started while copy-pair-forming volumes 41, 42 (27, 37) are in a paired state.

HORCM instances 24, 34 may be started up only when a volume copy is created. The decision regarding whether to allow HORCM instances 24, 34 to remain launched at other times is dependent on the operation of the storage system. In cases where HORCM instances 24, 34 are also started up after initial copying is complete, the fault monitoring function of the HORCM instances 24, 34 can be used. On the other hand, when the HORCM instances 24, 34 are resident, the system memory, CPU resources, and so forth of the host computers 20, 30 are also consumed. Because HORCM instances are generated in proportion to the number of copy pairs, the greater the number of resident HORCM instances, the larger the load of the host computer.

Therefore, in this embodiment example, the storage administrator is able to select whether to terminate the HORCM instance (delete the HORCM instance from the system memory) after initial copying is complete or to allow the HORCM instance to remain launched. For example, in the case of the operation of the fault-monitoring function, the HORCM instances are allowed to remain launched after the initial copying is complete. In another example, in the case of an operation that reduces the load of the host computer, the resources of the memory and CPU, and so forth are allocated to task application program 25 or a similar program by terminating the HORCM instance after the initial copying is complete.

The above-mentioned startup conditions and end conditions for the HORCM instances can be set individually for each HORCM instance. Alternatively, the configuration may be such that the startup conditions and end conditions established for one HORCM instance are reflected in all HORCM instances that are started up by the host computer. Further, the content of each table shown in FIG. 5 can be confirmed via UI 16.

Figure 6A:
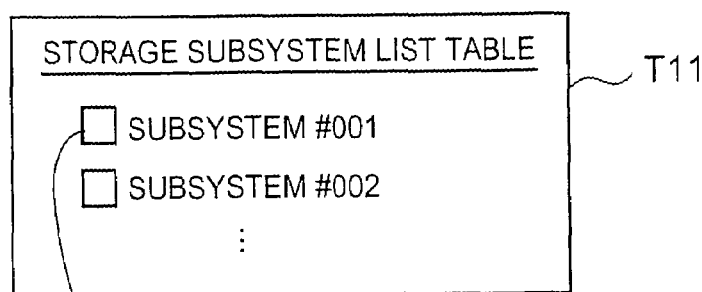
FIG. 6 is an illustrative view that schematically shows a method of confirming the traffic of a predetermined port.
Figure 6B:
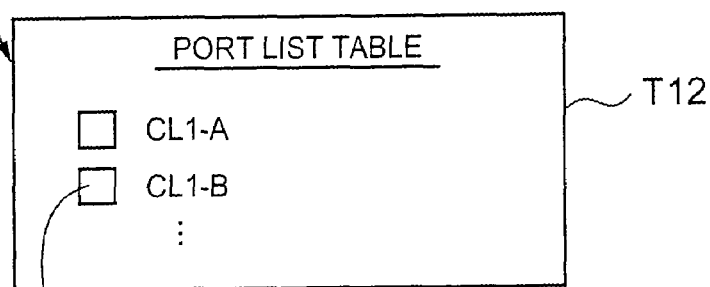
Figure 6C:
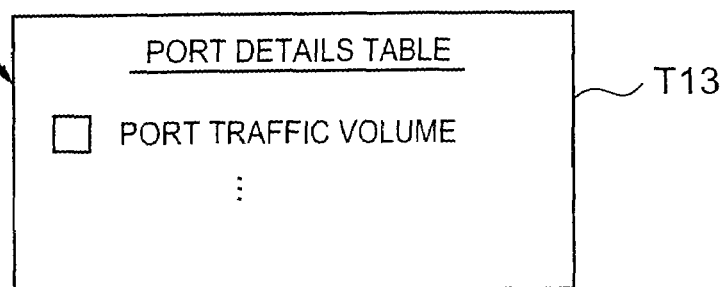

FIG. 6 is an illustrative view of part of the storage subsystem information that is managed by storage information management unit 13. For example, the names of all the storage subsystems constituting the storage system are displayed in list format in a storage subsystem list table T11, which also includes pointers to each storage subsystem. When the desired storage subsystem is selected from storage subsystem list table T11, a list of ports of the storage subsystem can be confirmed. When the desired port is selected from a port list table T12, the process moves to a port detail table T13, whereupon the volume of traffic of the port can be confirmed. By monitoring the volume of the traffic of the port through which volume copying is performed, the storage administrator is able to execute volume copying by starting up the HORCM instance only when the port is in a low load state.

FIG. 7 is a flowchart providing an overview of the volume copying (backup processing) of this embodiment example.

First, the storage administrator selects pair-forming volumes via the UI 16 and designates the copy conditions (S1). These copy conditions are startup conditions and end conditions mentioned previously in conjunction with the detailed information T4 on HORCM instance. The information designated by the storage administrator is stored in management server 10 (S2).

Management server 10 judges whether startup control for volume copying has been set (S3). A case in which startup control has not been set (S3: NO) occurs when a mode is designated in which the generation of configuration files and the startup of the HORCM instance are executed successively as a serial operation. Therefore, management server 10 instructs each of host computers 20, 30 to generate configuration files 23, 33 (S4). After confirming the generation of configuration files 23, 33, management server 10 instructs host computers 20, 30 to start up HORCM instances 24, 34 (S5). After confirming the startup of each of HORCM instances 24, 34, management server 10 instructs host computer 20, in which primary volume 27 is mounted, to start copying (S6). In this case, respective HORCM instances 24, 34 are also resident in respective host computers 20, 30 after the initial copying is complete.

Alternatively, a case where the execution of startup control is pre-designated for volume copying (S3: YES) occurs when a conditional startup mode has been designated. Therefore, management server 10 first instructs host computers 20, 30 to generate only configuration files 23, 33 (S7).

Next, the management server 10 monitors the load state of the SAN (the volume of traffic of the communication path used for the volume copying), the time, and so forth (S8). Here, the fact that volume copying is executed either when the load state is equal to or less than a predetermined value or when a predetermined time has been reached, is pre-designated.

In a case where a predetermined load state that has been pre-designated is reached or when a predetermined time that has been pre-designated is reached (S9: YES), it is determined whether other conditions for executing volume copying have been fulfilled. Here, two conditions are set, the first of which is that task application program 25 is not run by the host computer 20 that comprises primary volume 27 (S10), and the second of which is that backup device 39 is in a usable state (Ready state) in the host computer 30 that comprises secondary volume 37 (S11).

Further, when both conditions are fulfilled (S10: YES, S11: YES), management server 10 instructs host computers 20, 30 to start up HORCM instances 24, 34, respectively (S12). Further, after confirming the startup of HORCM instances 24, 34, management server 10 instructs (S13) host computer 20 to start the initial copying between pair-forming volumes.

In a case where completion of the initial copying between pair-forming volumes 27, 37 has been confirmed, management server 10 judges (S14) whether termination of HORCM instances 24, 34 has been designated after completion of the initial copying. When termination of HORCM instances 24, 34 has been pre-designated (S14: YES), management server 10 orders host computers 20, 30 to terminate HORCM instances 24, 34 (S15).

Figure 8:
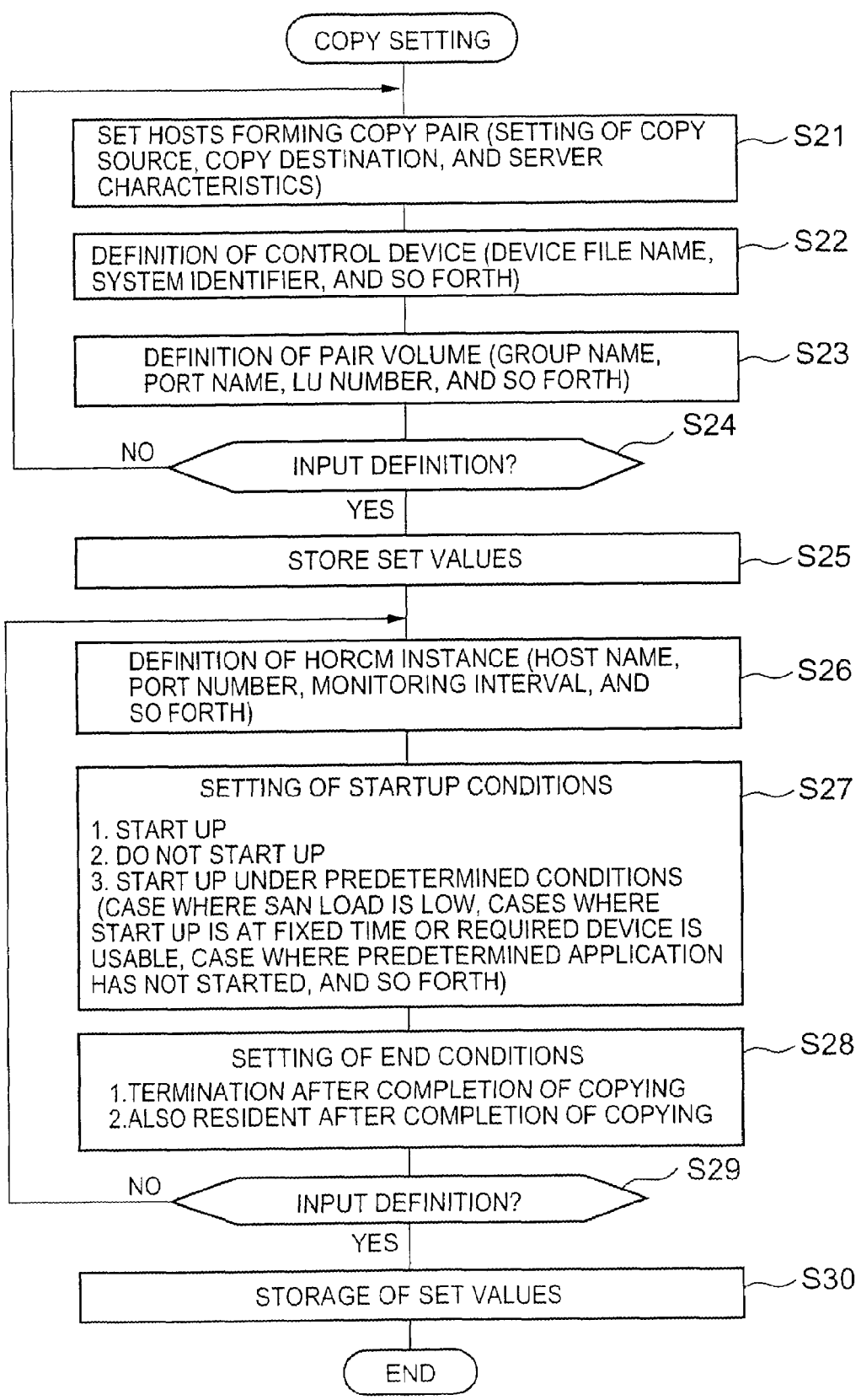
FIG. 8 is a flowchart showing the process by which startup conditions are inputted and so forth for pair-forming volumes and HORCM (Hitachi Open Remote Copy Module) instances.

FIG. 8 is a flowchart showing the details of step S1 in FIG. 7. The storage administrator performs setting of a pair-forming host computer via UI 16 (S21). For example, the storage administrator designates, as the copy source, the host computer that comprises the primary volume and designates, as the copy destination, the host computer that comprises the secondary volume. Further, the storage administrator designates server characteristics such that the designated host computers are the task server or the backup server.

Next, in step S22, the storage administrator defines a device file name, an identifier for the storage subsystem, and so forth, for the control device. The storage administrator also designates (S23) a group name, port name, LDEV number, and so forth, for the copy-pair-forming volumes.

Management server 10 judges (S24) whether an input for settings other than those for the HORCM instances has been defined. In cases where the definition of a control device, pair volumes, and so forth, is complete (S24: YES), management server 10 stores designated setting information in the memory (S25).

Next, management server 10 shifts to a HORCM instance definition screen by switching the screen displayed on UI 16. The storage administrator defines a HORCM instance via UI 16 (S26). The storage administrator then establishes startup conditions for defined HORCM instance (S27). Possible startup conditions include specific conditions for startup whereby the HORCM instance is started up automatically or is not started up automatically (the HORCM instance is started up under predetermined conditions). Then, after startup conditions have been set, the storage administrator sets end conditions (S28).

In cases where settings for HORCM instances are defined (S29: YES), management server 10 stores designated information in memory (S30). Since it also possible to set control device definitions, pair volume definitions, HORCM instance definitions, startup conditions and end conditions in a single screen, the configuration may be such that there is no necessity to switch the screen projected on UI 16.

Figure 9:
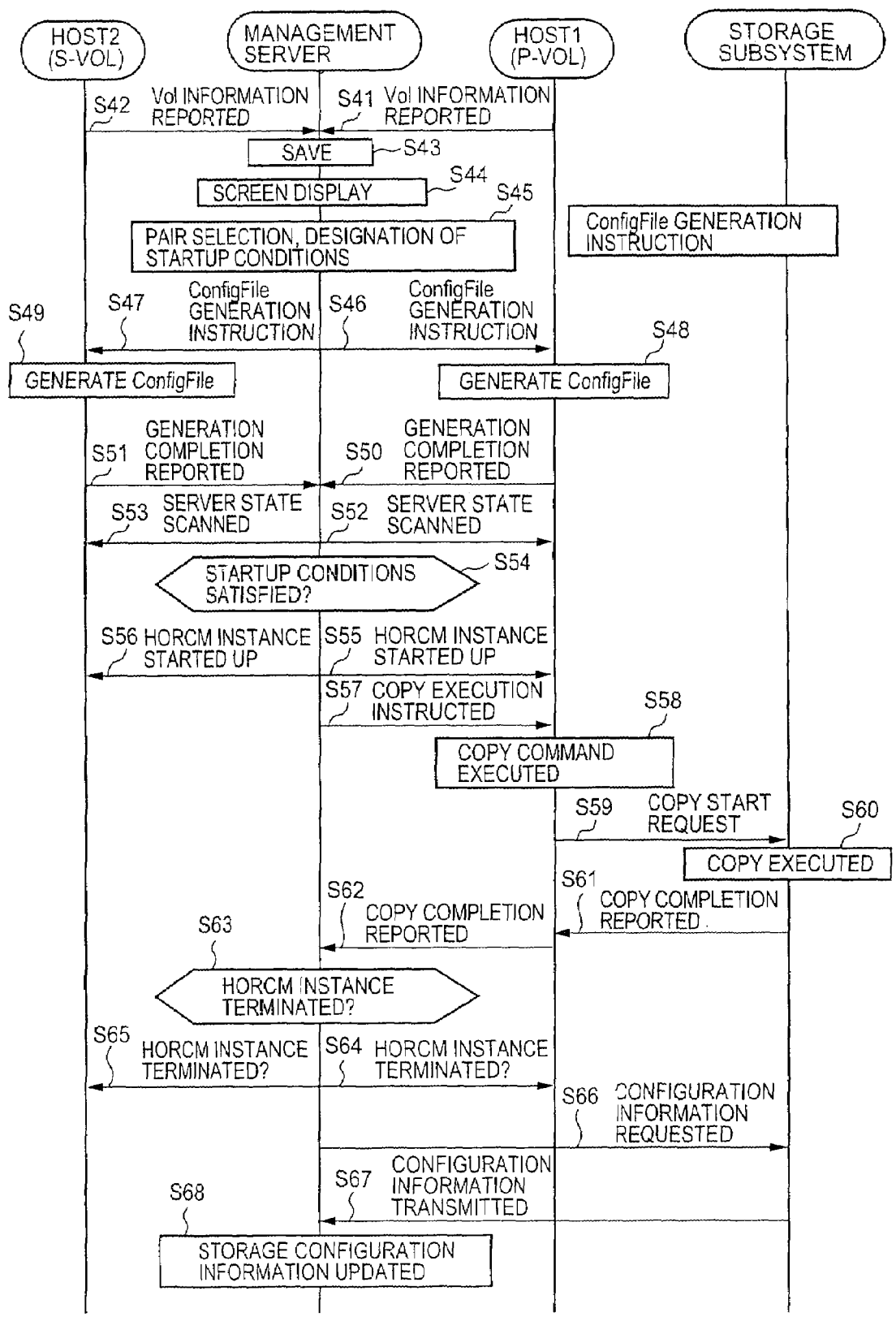
FIG. 9 is a sequence diagram showing the overall operation of the storage system.

FIG. 9 is a schematic sequence diagram of the storage system. Initially, the host computers 20, 30 send information on the respective volumes allocated thereto (abbreviated to "Vol") to management server 10 via communication network CN1 (S41, S42).

Management server 10 saves volume information acquired from the respective host computers 20, 30 in memory (S43). Management server 10 selects a copy pair based on stored volume information and storage configuration information acquired previously from storage subsystem 40 and displays a screen for setting copy conditions on UI 16 (S44). The storage administrator designates (S45) information on the host computers and volumes that form the copy pair, as well as the copy conditions (startup conditions, end conditions), based on the screen displayed on the UI 16.

When one copy pair, comprising host computer 20 within which the primary volume is established and host computer 30 within which the secondary volume is established, is selected by the storage administrator, the copy pair control unit sends a configuration file generation instruction to each of selected host computers 20, 30 via communication network CN1 (S46, S47). Respective host agents 21, 31, belonging to the host computers 20, 30 that receive the instruction from the management server 10, then generate configuration files 23, 33 on the basis of the content of the instruction (S48, S49). Respective host agents 21, 31 then send notice of the generation of configuration files 23, 33 to management server 10 via the communication network CN1 (S50, S51). Preparations for copying between the pair-forming volumes are completed as a result of generating configuration files 23, 33.

Following receipt of the report that generation of configuration files 23, 33 is complete, management server 10 monitors the respective states of host computers 20, 30 (S52, S53) on the basis of the preset startup conditions. In cases where startup conditions have not been established, startup of the HORCM instance is instructed after confirming the generation of the configuration file (S55, S56). It is assumed here that at least one or more startup conditions have been established. It is also assumed here that sub-startup conditions linking the states of respective host computers 20, 30 have also been established.

When necessary, management server 10 determines whether the main startup condition (indicating that a predetermined load state has been reached or a predetermined time has been reached) and the sub-startup condition (indicating that a predetermined device is usable or a predetermined process has not started) have both been fulfilled (S54). When the startup conditions have all been fulfilled (S54: YES), management server 10 instructs (S55, S56) respective host computers 20, 30 to start up HORCM instances 24, 34.

Upon receipt of a startup completion report for HORCM instances 24, 34 from the respective host agents 21, 31, management server 10 instructs host computer 20 to execute copying (S57).

Upon receipt of the copy start instruction from management server 10, host computer 20 executes a copy command (S58), and asks storage subsystem 40 to start copying (S59).

The storage subsystem 40 then copies (S60) the stored content of logical volume 41, designated as the primary volume, to logical volume 42, designated as the secondary volume, so that there is a match between the stored content of the selected volumes. When copying is complete, storage subsystem 40 reports the completion of copying to host computer 20 (S61). Upon receipt of the copy completion report from the storage subsystem 40, host computer 20 reports the completion of copying to management server 10 (S62).

Upon confirming the completion of volume copying, management server 10 judges (S63) whether end conditions, such as that of terminating HORCM instances 24, 34 after the initial copying is complete, have been preset. When termination of HORCM instances 24, 34 has been designated, management server 10 instructs respective host computers 20, 30 to terminate HORCM instances 24, 34 (S64, S65). Upon receipt of the instruction, host agents 21, 31 terminate HORCM instances 24, 34 respectively.

Management server 10 then asks storage subsystem 40 to acquire current storage configuration information (S66). When storage subsystem 40 sends the latest storage configuration information to management server 10 (S67), management server 10 updates (S68) the stored content of configuration information DB 12 on the basis of the latest storage configuration information.

Figure 10:
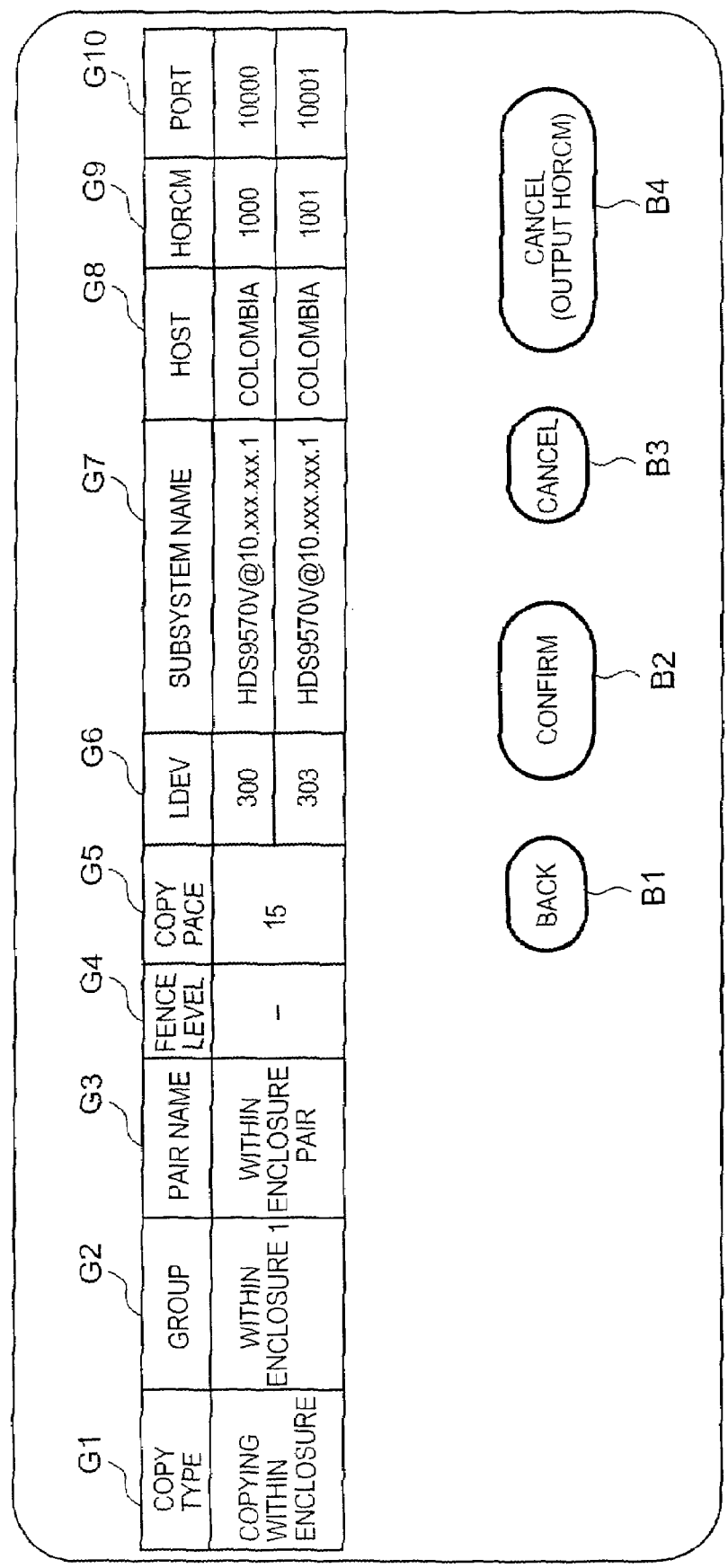
FIG. 10 is an illustrative view of an example of a screen for designating pair-forming volumes.

FIG. 10 is an illustrative view of part of a screen in a case where paired-volume information, copy conditions, and so forth, are established. Displayed on the screen shown in FIG. 10 are, for example: a copy-type designation section G1, a group name designation section G2, a copy-pair name designation section G3, a fence-level designation section G4, a copy-pace designation section G5, a volume designation section G6 for designating the LDEV that are to become the primary and secondary volumes, a subsystem name designation section G7 for displaying the storage subsystem to which the volume belongs, a host name designation section G8 for displaying the name of the host used by the volume, a HORCM instance ID number designation section G9, and an interprogram communication port number designation section G10.

In addition, the screen displays a back button B1 for returning to the previous screen (not shown), an input definition button B2, a cancel button B3 for canceling the input operation, and a partial cancel button B4. Operation of partial cancel button B4 causes only the startup of the HORCM instance to be canceled without the series of operations from the creation of the configuration file to the startup of the HORCM instance being performed.

The cancellation of the startup of the HORCM instance as a result of operating the partial cancel button B4 is included in the "designation of startup conditions" in S45 in FIG. 9. That is, the operation of partial cancel B4 designates a condition in which the HORCM instance is not started up. When a mode, in which only a configuration file is created and the startup of the HORCM instance is deferred unconditionally, is selected, processing ends at the point at which S51 in FIG. 9 is complete.

Therefore, when partial cancel button B4 is operated, the configuration file alone is generated on the host computer. In cases where the HORCM instance is started up, a HORCM instance startup instruction may be sent either to the host computer by management server 10 or a startup command may be inputted directly by operating the UI of the host computer.

Further, an embodiment in which not all of the respective designation sections G1 to G10 need necessarily be designated by the storage administrator is also possible, some designation sections being automatically set with predetermined values. Further, in copy-type designation section G1, any one copy type can be selected from among a plurality of pre-prepared types of copying. For example, possible types of copying can include performing volume copying within the same storage subsystem "copying within enclosure", and performing volume copying between different storage subsystems "copying between enclosures".

Figure 11:
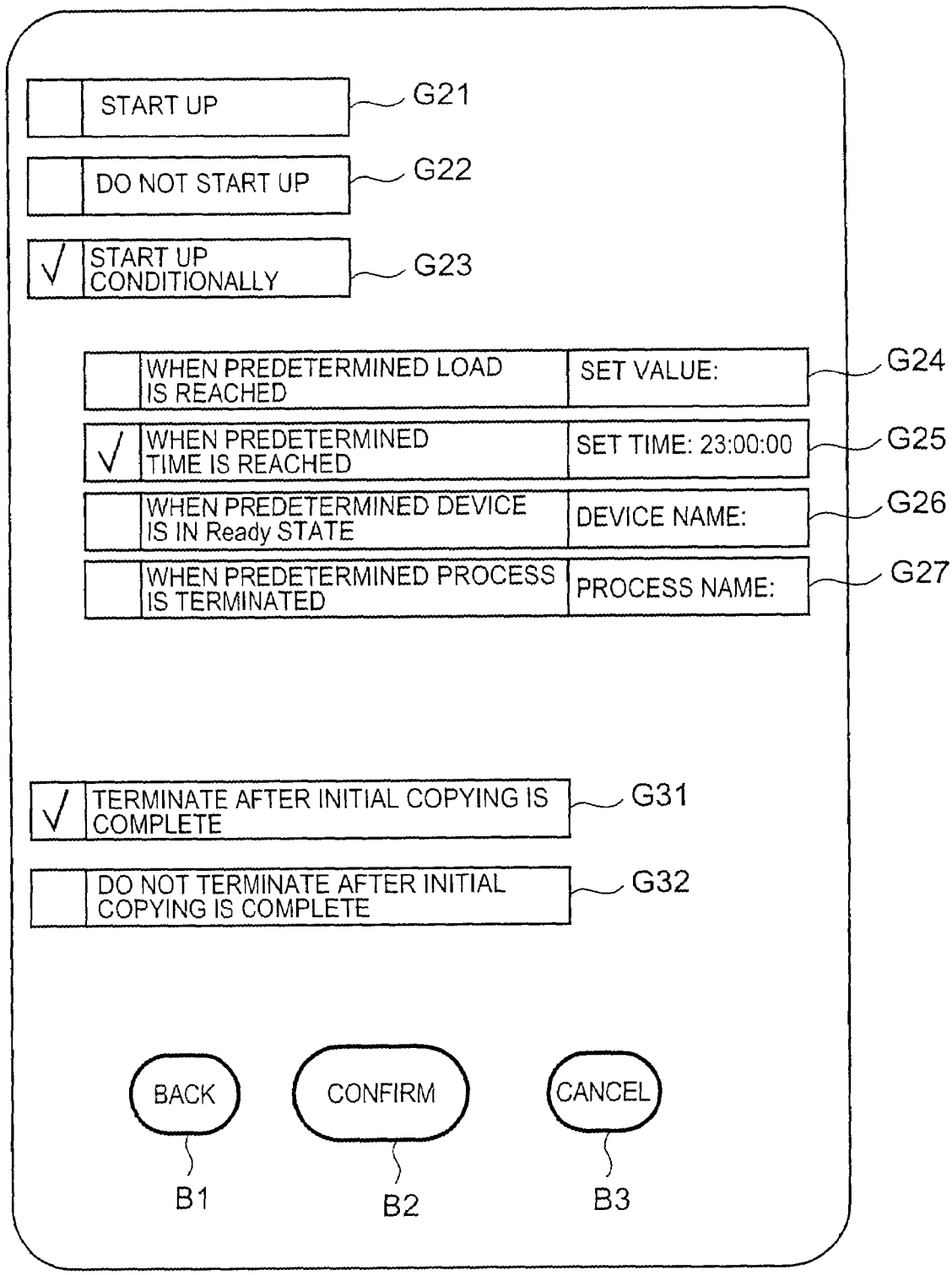
FIG. 11 is an illustrative view of an example of a screen for designating startup conditions for HORCM instances.

FIG. 11 is an illustrative view of an example of a screen for designating startup conditions and end conditions for HORCM instances. The screen shown in FIG. 10 shows a case where two modes, which are a mode in which the HORCM instance is also started when volume copying is set, and a mode in which HORCM instances are not started, can be selected.

The screen shown in FIG. 11 also displays a mode in which HORCM instances are started conditionally. Further, FIG. 11 also shows an aspect of the invention in which HORCM-instance end conditions can be set. HORCM instance startup conditions are designated at the top of the screen, and HORCM instance end conditions are designated at the bottom of the screen.

Three modes are prepared as modes for designating the startup conditions. The first mode is a mode in which the HORCM instance is started up directly after the creation of the configuration file. The second mode is a modein which the HORCM instance is not started up after the creation of the configuration file. The third mode is a mode in which the HORCM instance is started up conditionally after the creation of the configuration file. The second and third modes, also known as preparation modes, share the characteristic of separating the generation of the configuration file from the startup of the HORCM instance.

The first mode can be selected by means of first mode designation section G21. Likewise, the second and third modes can be selected by means of second mode designation section G22 and third mode designation section G23, respectively.

When the third mode is selected, predetermined conditions for starting up the HORCM instance can be selected. Possible conditions include, as mentioned earlier, a case where the storage subsystem is in a low load state (G24), a case where a predetermined time has been reached (G25), a case where a predetermined device can be used on the backup server side (G26), and a case where a predetermined process is terminated on the task server side (G27), and so forth. Conditions G24 to G27 can also be called predetermined condition designation sections, for example.

Two modes, for example, are prepared as modes for designating the end conditions. The first mode is a mode in which the HORCM instance is terminated after the initial copying is complete (G31). The second mode is a mode in which the HORCM instance is not terminated after completion of the initial copying (G32).

This embodiment example is defined as above and therefore provides the following effects. The output timing of an instruction to execute volume copying is controllable. Therefore, the required processing can be executed in accordance with the requirements on each occasion, thus increasing user convenience.

For example, in this embodiment example, the execution of volume copying can be controlled in two stages, the first stage of which is a preparation stage in which only the generation of the configuration file is performed, and the second stage of which is an execution stage in which the HORCM instance is started up and copying is executed. Therefore, the HORCM instance can be started up only when the pair volumes are operated, and hence the computer resources of the host computer can be efficiently used, whereby user convenience is improved.

In this embodiment example, a plurality of modes are prepared, namely a mode in which the generation of a configuration file and the startup of the HORCM instance are executed automatically as a series of processes, a mode in which the configuration file alone is generated, and a mode in which the HORCM instance is started up under predetermined conditions after the configuration file has been generated, these modes being selected by the storage administrator. Therefore, a suitable mode can be selected in accordance with the operation of the storage system.

In addition, the load state of the storage subsystem, the time, the state of a predetermined device, and the startup state of a predetermined process are prepared as specific startup conditions. Therefore, a more suitable operation can be executed.

In this embodiment example, a HORCM instance can be terminated after completion of the initial copying. Therefore, the load of the host computer can be reduced and the computer resources can be allocated to another process.

2. Second Embodiment Example

Figure 12:
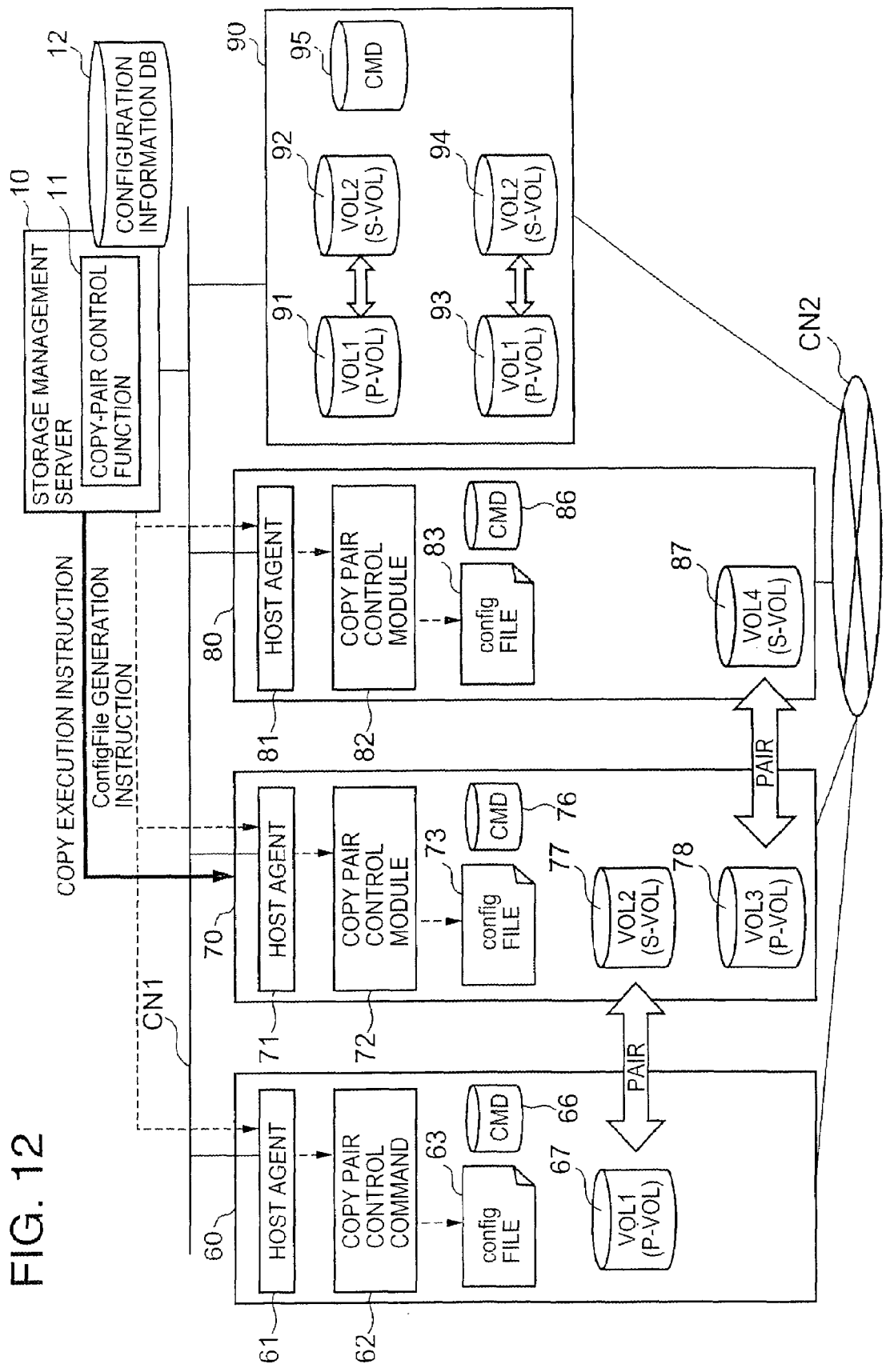
FIG. 12 is a block diagram providing an overview of a storage system of a second embodiment example of the present invention.

FIG. 12 is a view of the overall storage system configuration according to a second embodiment example of the present invention. This embodiment example is equivalent to a modified example of the first embodiment example.

Three host computers 60, 70, and 80, for example, are provided in this storage system. Respective host computers 60, 70, and 80 are each provided with host agents 61, 71, and 81; copy-pair control commands 62, 72, and 82; configuration files 63, 73, and 83; and control devices 66, 76, and 86; HORCM instances, applications, and so forth (none of which is illustrated), and volumes.

The first host computer 60 has a primary volume 67. Second host computer 70 comprises a secondary volume 77 that forms a pair with the primary volume 67 of the first host computer 60. Second host computer 70 also comprises primary volume 78. The third host computer 80 comprises a secondary volume 87 that forms a pair with the primary volume 78 of the second host computer 70.

Further, configuration file 63 of first host computer 60 records relationships between primary volume 67 and secondary volume 77 that form the first pair. Configuration file 73 of second host computer 70 records relationships between primary volume 67 and secondary volume 77 that form the first pair, and the relationships between primary volume 78 and secondary volume 87 that form the second pair. Configuration file 83 of the third host computer 80 records the relationship between primary volume 78 and secondary volume 87 that form the second pair.

A storage subsystem 90 comprises a total of four volumes 91 to 94 that form two copy pairs, the first pair comprising volumes 91 and 92 and the second pair comprising volumes 93 and 94, and a control device 95. The first pair contains a logical volume 91 supplied to first host computer 60 and a logical volume 92 supplied to second host computer 70. The second pair contains a logical volume 93 supplied to second host computer 70 and a logical volume 94 supplied to third host computer 80.

Management server 10 is able to instruct host computers 60, 70, and 80 to generate configuration files and start up the HORCM instance. At such time, the storage administrator is able to select any one mode from among a plurality of modes to start up the HORCM instance.

Management server 10 is able to instruct each of host computers 60, 70, both of which comprise a primary volume, to execute a copy command. Alternatively, second host computer 70, which is part of either of the two pairs, can alone be asked to execute the copy command.

FIG. 13 is a block diagram showing an example of a disk array device that can be used as the storage subsystem of this embodiment example.

Controller 120 of the disk array device controls the operation of storage device 130. Controller 120 comprises a plurality of channel adapters (CHA) 121, a plurality of disk adapters (DKA) 122, a main controller 123, a shared memory 124, a cache memory 125, and a connector 126 that mutually connects these parts 121 to 125, for example.

Channel adapters 121 and disk adapters 122 are constituted as a microcomputer system that also comprises a microprocessor, memory, and so forth. Each of channel adapters 121 is connected to host computers 110 to 112, respectively, and each is capable of individually processing a request from each of host computers 110 to 112. Main controller 123 unifies the operation within controller 120. Each of disk adapters 122 exchanges data with disk 131 of storage device 130. Various commands, control information, and so forth, are stored in shared memory 124 and the work area is also set. Data that is to be written to disk 131 and data that is read out from disk 131 are temporarily stored in cache memory 125.

A highly functional disk array device constituted in this manner can be used as a storage subsystem.

Further, the present invention is not limited to the above embodiment example. A person skilled in the art is able to make a variety of additions, modifications, and so forth within the scope of the present invention. Although the focus in each of the embodiment examples is on copying between volumes, the present invention is not limited to such copying and may have applicability to a remote operation for other processes.

What is claimed is:

1. A storage system that comprises at least two host computers, at least one storage device that provides the host computers with storage regions, a management computer capable of managing the storage devices and the host computers, and a memory having storage configuration information including information relating to allocation of the storage regions to the host computers, the management computer comprising:

a reconfiguration instruction section that generates, in response to the management computer receiving a reconfiguration request, a plurality of reconfiguration instructions for instructing the host computers to change their respective storage configuration on the basis of the storage configuration information, and outputs the reconfiguration instructions to the host computers; and a progress management unit operatively coupled to the reconfiguration instruction section and which controls the timing by which the reconfiguration instructions are output to the host computers, wherein each host computer outputs reconfiguration orders to the storage device to change its respective storage configuration based on its reconfiguration instruction received from the reconfiguration instruction section.

2. The storage system according to claim 1, wherein the progress management unit is capable of outputting the reconfiguration instructions for each host computer as a plurality of sub-instructions.

3. The storage system according to claim 1, wherein the progress management unit is capable of:

outputting the reconfiguration instructions for each host computer as a plurality of stages including a preparing stage wherein each host computer is instructed to prepare for reconfiguring its storage configuration and an execution stage wherein each host computer is instructed to output instructions to the storage device instructions prepared during the preparing stage; and controlling the timing as to between the proceed with the with the execution stage based on one or more predetermined execution conditions.

4. The storage system according to claim 3, wherein the one or more predetermined execution conditions include at least any one of a case where the storage device is in a predetermined low load state, a case where a designated time has been reached, a case where a predetermined device can be used, and a case where a predetermined program has not started.

5. The storage system according to claim 1, wherein, when the storage device has completed processing the reconfiguration orders received from the host computers, the progress management unit causes the host computers to terminate reconfiguration processes respectively executing on the host computers on the basis of preset end conditions.

6. The storage system according to claim 1, wherein
the reconfiguration instructions include reconfiguration preparation instructions for instructing the host computers to prepare to reconfigure their respective storage and reconfiguration execution instructions for instructing the host computers to output reconfiguration orders to the storage device, the reconfiguration orders being based on the reconfiguration preparation instructions; and
the progress management unit is configured to cause the reconfiguration instruction section to
(1) output the reconfiguration preparation instructions to the host computers, and
(2) subsequent to outputting the reconfiguration preparation instructions, output the reconfiguration execution instructions to the host computers when one or more preset execution conditions are fulfilled.

7. The storage system according to claim 6, wherein
(1) when the reconfiguration preparation instructions are received by the host computers, each host computer generates a configuration file relating to the reconfiguration orders to be sent out to the storage device; and
(2) when the reconfiguration execution instructions received by the host computers, each host computer outputs its reconfiguration orders to the storage device on the basis of its configuration file.

* * * * *